US009852306B2

(12) United States Patent
Cash et al.

(10) Patent No.: US 9,852,306 B2
(45) Date of Patent: Dec. 26, 2017

(54) CONJUNCTIVE SEARCH IN ENCRYPTED DATA

(71) Applicant: International Business Machines Corporation, Armonk, NY (US)

(72) Inventors: Charles D. Cash, Highland Park, NJ (US); Stanislaw Jarecki, Irvine, CA (US); Charanjit S. Jutla, Elmsford, NY (US); Hugo M. Krawczyk, Tarrytown, NY (US); Marcel C. Rosu, Ossining, NY (US); Michael Steiner, New York, NY (US)

(73) Assignee: International Business Machines Corporation, Armonk, NY (US)

( * ) Notice: Subject to any disclaimer, the term of this patent is extended or adjusted under 35 U.S.C. 154(b) by 667 days.

(21) Appl. No.: 13/958,739

(22) Filed: Aug. 5, 2013

(65) Prior Publication Data
US 2015/0039885 A1    Feb. 5, 2015

(51) Int. Cl.
*H04L 29/06* (2006.01)
*G06F 21/62* (2013.01)
*G06F 21/33* (2013.01)
*H04L 9/08* (2006.01)

(52) U.S. Cl.
CPC ........ *G06F 21/6227* (2013.01); *G06F 21/335* (2013.01); *H04L 9/0894* (2013.01); *H04L 63/0435* (2013.01); *G06F 2221/2141* (2013.01); *G06F 2221/2149* (2013.01); *H04L 63/0428* (2013.01); *H04L 63/168* (2013.01)

(58) Field of Classification Search
CPC ......... H04L 9/08; H04L 9/32; H04L 63/0428; H04L 63/0435; H04L 63/168
See application file for complete search history.

(56) References Cited

U.S. PATENT DOCUMENTS

| | | | |
|---|---|---|---|
| 7,783,899 B2 | 8/2010 | Golle et al. | |
| 7,874,013 B2 | 1/2011 | Kaminaga et al. | |
| 8,086,619 B2 | 12/2011 | Haahr et al. | |
| 8,291,237 B2 | 10/2012 | Ostrovsky et al. | |
| 8,307,210 B1 * | 11/2012 | Duane ................... | H04L 9/0897 380/42 |
| 8,380,720 B2 | 2/2013 | Chang et al. | |
| 8,819,451 B2 | 8/2014 | Lokam et al. | |
| 2003/0046572 A1 | 3/2003 | Newman et al. | |
| 2005/0004924 A1 | 1/2005 | Baldwin | |
| 2006/0041533 A1 | 2/2006 | Koyfman | |
| 2006/0277413 A1 | 12/2006 | Drews | |

(Continued)

OTHER PUBLICATIONS

Dan Boneh et al., Conjunctive, Subset, and Range Queries on Encrypted Data, Feb. 21-24, 2007, ACM, pp. 535-554.*

(Continued)

*Primary Examiner* — Kari Schmidt
*Assistant Examiner* — Fahimeh Mohammadi
(74) *Attorney, Agent, or Firm* — Jeff S. LaBaw; Ryan, Mason & Lewis, LLP

(57) ABSTRACT

A method comprises receiving a first cryptographic token for one search term and a second cryptographic token is generated using the one search term and at least another search term. A first search is conducted using the first cryptographic token to generate a first result set, and the second cryptographic token is used for computing a subset of results of the first result set.

28 Claims, 7 Drawing Sheets

(56) References Cited

U.S. PATENT DOCUMENTS

| | | | |
|---|---|---|---|
| 2007/0073731 | A1 | 3/2007 | Reimer et al. |
| 2008/0059414 | A1 | 3/2008 | Cristofor et al. |
| 2008/0133935 | A1* | 6/2008 | Elovici .............. G06F 21/6227 713/193 |
| 2009/0292677 | A1 | 11/2009 | Kim |
| 2010/0023727 | A1* | 1/2010 | Lim ..................... H04L 45/745 711/216 |
| 2010/0114964 | A1 | 5/2010 | Kerschbaum et al. |
| 2010/0138399 | A1* | 6/2010 | Jho ................... G06F 17/30979 707/696 |
| 2010/0146299 | A1 | 6/2010 | Swaminathan et al. |
| 2010/0153403 | A1* | 6/2010 | Chang .............. G06F 17/30616 707/747 |
| 2010/0161957 | A1 | 6/2010 | Chang et al. |
| 2010/0169665 | A1 | 7/2010 | Kang et al. |
| 2010/0185847 | A1 | 7/2010 | Shasha et al. |
| 2010/0211800 | A1 | 8/2010 | La Rocca et al. |
| 2010/0287173 | A1* | 11/2010 | Schneider ......... G06F 17/30628 707/759 |
| 2011/0145594 | A1 | 6/2011 | Jho et al. |
| 2012/0078914 | A1* | 3/2012 | Roeder ............. G06F 17/30619 707/741 |
| 2012/0158734 | A1 | 6/2012 | Chang et al. |
| 2012/0237030 | A1* | 9/2012 | Ghouti ................. H04L 9/3066 380/255 |
| 2012/0239930 | A1* | 9/2012 | Zaverucha ........... H04L 9/3066 713/168 |
| 2012/0310915 | A1* | 12/2012 | Yang ................. G06F 17/30622 707/711 |
| 2013/0046974 | A1* | 2/2013 | Kamara .............. G06F 21/6218 713/165 |
| 2013/0067225 | A1 | 3/2013 | Shochet et al. |
| 2013/0159694 | A1* | 6/2013 | Chiueh ................... H04L 9/008 713/150 |
| 2013/0179431 | A1* | 7/2013 | Dumitrean ........ G06F 17/30622 707/711 |
| 2013/0238646 | A1 | 9/2013 | Maro |
| 2013/0339751 | A1 | 12/2013 | Sun et al. |
| 2014/0090081 | A1 | 3/2014 | Mattsson et al. |
| 2014/0108435 | A1 | 4/2014 | Kolesnikov |
| 2014/0237257 | A1 | 8/2014 | Dayka et al. |
| 2015/0033032 | A1 | 1/2015 | Furukawa |

OTHER PUBLICATIONS

Carlos Garcia-Alvarado et al., Information Retrieval from Digital Libraries in SQL,Oct. 30, 2008, ACM, pp. 55-62.*
Elaine Shi et al., Multi-Dimensional Range Query over Encrypted Data, May 20-23, 2007, IEEE, pp. 1-15.*
Ming Li et al., Authorized Private Keyword Search over Encrypted Data in Cloud Computing, Jun. 20-24, 2011, IEEE, pp. 383-392.*
M. Abdalla et al., "Searchable Encryption Revisited: Consistency Properties, Relation to Anonymous IBE, and Extensions," Proceedings of the 25th Annual International Cryptology Conference on Advances in Cryptology (CRYPTO), Lecture Notes in Computer Science, Aug. 2005, pp. 205-222, vol. 3621.
R. Arratia et al., "Two Moments Suffice for Poisson Approximations: The Chen-Stein Method," The Annals of Probability, Apr. 1989, pp. 9-25, vol. 17, No. 1.
L. Ballard et al., "Achieving Efficient Conjunctive Keyword Searches Over Encrypted Data," Proceedings of the 7th International Conference on Information and Communications Security (ICICS), Lecture Notes in Computer Science, Dec. 2005, pp. 414-426, vol. 3783.
M. Bellare et al., "Deterministic and Efficiently Searchable Encryption," Proceedings of the 27th Annual International Cryptology Conference on Advances in Cryptology (CRYPTO), Lecture Notes in Computer Science, Aug. 2007, pp. 535-552, vol. 4622.
M. Bellare et al., "The FFX Mode of Operation for Format-Preserving Encryption," Draft 1.1, NIST Block Cipher Modes Working-Group, Feb. 2010, 18 pages.
Burton H. Bloom, "Space/Time Trade-Offs in Hash Coding with Allowable Errors," Communications of the ACM, Jul. 1970, pp. 422-426, vol. 13, No. 7.
D. Boneh et al., "Efficient Selective-ID Secure Identity-Based Encryption Without Random Oracles," Proceedings of the International Conference on the Theory and Applications of Cryptographic Techniques on Advances in Cryptology (EUROCRYPT), Lecture Notes in Computer Science, May 2004, pp. 223-238, vol. 3027.
D. Boneh et al., "Short Signatures Without Random Oracles," Proceedings of the International Conference on the Theory and Applications of Cryptographic Techniques, Advances in Cryptology—EUROCRYPT, Lecture Notes in Computer Science, May 2004, pp. 56-73, vol. 3027, Interlaken, Switzherland.
D. Boneh et al., "Public Key Encryption with Keyword Search," Proceedings of the International Conference on the Theory and Applications of Cryptographic Techniques, Advances in Cryptology—EUROCRYPT, Lecture Notes in Computer Science, May 2004, pp. 506-522, vol. 3027, Interlaken, Switzherland.
D. Boneh et al., "Conjunctive, Subset, and Range Queries on Encrypted Data," Proceedings of the 4th Theory of Cryptography Conference (TCC), Lecture Notes in Computer Science, Feb. 2007, vol. 4392, Amsterdam, The Netherlands.
J.W. Byun et al., "Efficient Conjunctive Keyword Search on Encrypted Data Storage System," Proceedings of the Third European PKI Workshop on Theory and Practice (EuroPKI), Lecture Notes in Computer Science, Jun. 2006, pp. 184-196, vol. 4043, Turin, Italy.
Y.-C. Chang et al., "Privacy Preserving Keyword Searches on Remote Encrypted Data," Proceedings of the Third International Conference on Applied Cryptography and Network Security (SCNS), Lecture Notes in Computer Science, Jun. 2005, pp. 442-455, vol. 3531.
M. Chase et al., "Structured Encryption and Controlled Disclosure," Proceedings of the 16th International Conference on the Theory and Application of Cryptology and Information Security, Advances in Cryptology—ASIACRYPT, Lecture Notes in Computer Science, Dec. 2010, pp. 577-594, vol. 6477, Singapore.
R. Curtmola et al., "Searchable Symmetric Encryption: Improved Definitions and Efficient Constructions," Proceedings of the 13th ACM Conference on Computer and Communications Security (CCS), Oct.-Nov. 2008, pp. 79-88.
S. Sedghi et al. "Adaptively Secure Computationally Efficient Searchable Symmetric Encryption," Technical Report TR-CTIT-09-13, Centre for Telematics and Information Technology University of Twente, http://purl.utwente.nl/publications/65475, Apr. 2009, 17 pages.
S.D. Galbraith et al., "Pairings for Cryptographers," Discrete Applied Mathematics, Sep. 2008, pp. 3113-3121, vol. 156, No. 16.
Craig Gentry, "Fully Homomorphic Encryption Using Ideal Lattices," Proceedings of the 41st Annual ACM Symposium on Theory Computing (STOC), May-Jun. 2009, pp. 169-178.
Eu-Jin Goh, "Secure Indexes," IACR Cryptology ePrint Archive, Oct. 2003, 19 pages.
S. Goldwasser et al., "Invariant Signatures and Non-Interactive Zero-Knowledge Proofs are Equivalent (Extended Abstract)," Proceedings of the 12th Annual International Cryptology Conference on Advances in Cryptology—CRYPTO, Lecture Notes in Computer Science, Aug. 1992, pp. 228-245, vol. 740.
Iarpa, "Security and Privacy Assurance Research (SPAR) Program," Broad Agency Announcement (BAA), Safe and Secure Operations Office, Dec. 2010, 76 pages.
S. Kamara et al., "Cryptographic Cloud Storage," Financial Cryptography and Data Security, Lecture Notes in Computer Science, Jan. 2010, pp. 136-149, vol. 6054, Canary Islands, Spain.
S. Kamara et al., "CS2: A Searchable Cryptographic Cloud Storage System," Microsoft Research, http:research.microsoft.com/pubs/148632/CS2.pdf, Microsoft Technical Report, May 2011, 25 pages.
S. Kamara et al., "Dynamic Searchable Symmetric Encryption," 19th ACM Conference on Computer and Communications Security (CCS), 2012, pp. 965-976.
K. Kurosawa et al., "UC-Secure Searchable Symmetric Encryption," 16th International Conference on Financial Cryptography and

(56) References Cited

OTHER PUBLICATIONS

Data Security, Lecture Notes in Computer Science, Feb.-Mar. 2012, pp. 285-298, vol. 7397, Kralendijk, Bonaire.

Lemur Project, "The ClueWeb09 Dataset," http://lemurpoject.org/clueweb09.php/, Jan.-Feb. 2009, 2 pages.

R.A. Popa et al., "CryptDB: Protecting Confidentiality with Encrypted Query Processing," 23rd ACM Symposium on Operating Systems Principles (SOSP), Oct. 2011, pp. 85-100, Cascais, Portugal.

E. Shi et al., "Multi-Dimensional Range Query Over Encrypted Data," IEEE Symposium on Security and Privacy, May 2007, pp. 350-364.

D.X. Song et al., "Practical Techniques for Searches on Encrypted Data," IEEE Symposium on Security and Privacy, May 2000, pp. 44-55.

P. Van Liesdonk et al., "Computationally Efficient Searchable Symmetric Encryption," in Proc. Workshop on Secure Data Management (SDM), Lecture Notes in Computer Science, 2010, pp. 87-100, vol. 6358.

B.R. Waters, "Building an Encrypted and Searchable Audit Log," 11th Annual Network and Distributed System Security Symposium (NDSS), Jan. 2004, 10 pages.

U.S. Appl. No. 13/958,730, filed in the name of C.D. Cash et al. Aug. 5, 2013 and entitled "Masking Query Data Access Pattern in Encrypted Data."

M.S. Islam et al., "Access Pattern Disclosure on Searchable Encryption: Ramification, Attack and Mitigation," Network and Distributed System Security Symposium (NDSS), Feb. 2011, 15 pages.

S. Ananthi et al., "Privacy Preserving Keyword Search Over Encrypted Cloud Data," Advances in Computing and Communications, Communications in Computer and Information Science, Jul. 2011, pp. 480-487, vol. 190, Part 1.

S. Zittrower et al., "Encrypted Phrase Searching in the Cloud," IEEE Global Communications Conference (GLOBECOM), http://www.cs.uctedut~czou/research/EncryptedCloud-Globecom12.pdf, Dec. 2012, 7 pages.

J. Heurix et al., "Pseudonymization with Metadata Encryption for Privacy-Preserving Searchable Documents," IEEE 45th Hawaii International Conference on System Sciences (HICSS), Jan. 2012, pp. 3011-3020.

P. Golle et al., "Secure Conjunctive Keyword Search Over Encrypted Data," Applied Cryptography and Network Security, Lecture Notes in Computer Science, Jun. 2004, pp. 31-45, vol. 3089.

E. Shmueli et al., "Designing Secure Indexes for Encrypted Databases," Ben-Gurian University of the Negev, 2012, 12 pages.

W. Lu et al., "Enabling Search Over Encrypted Multimedia Databases," University of Maryland, 2009, 11 pages.

D. Liu et al., "Programmable Order-Preserving Secure Index for Encrypted Database Query," IEEE Fifth International Conference on Cloud Computing, Jun. 2012, pp. 502-509.

H-A Park et al., "Secure Index Search for Groups," Lecture Notes in Computer Science, 2005, pp. 128-140, vol. 2592.

\* cited by examiner

ENCRYPTED DATABASE SETUP
103

RAW DATABASE
201

| RECORD INDEX | ATTRIBUTE FIRST NAME | ATTRIBUTE LAST NAME | ATTRIBUTE GENDER | ATTRIBUTE AGE | DATA |
|---|---|---|---|---|---|
| 1 | JOHN | SMITH | M | 23 | |
| 2 | ALEX | SIMONE | M | 23 | |
| 3 | ELAINE | SMITH | F | 33 | |

ENCRYPTED DATABASE 301
302 TSet
303 XSet

TSet
302

| | | |
|---|---|---|
| 3022a — | ENCRYPTED TUPLE LIST FOR JOHN | STag(JOHN) — 3021a |
| 3022b — | ENCRYPTED TUPLE LIST FOR ALEX | STag(ALEX) — 3021b |
| 3022c — | ENCRYPTED TUPLE LIST FOR SMITH | STag(SMITH) — 3021c |
| 3022d — | ENCRYPTED TUPLE LIST FOR SIMONE | STag(SIMONE) — 3021d |
| 3022e — | ENCRYPTED TUPLE LIST FOR 23 | STag(23) — 3021e |
| 3022f — | ENCRYPTED TUPLE LIST FOR 18 | STag(18) — 3021f |
| | .... | .... |
| | .... | .... |
| | .... | .... |
| | .... | .... |

STag FOR SMITH
3021c

FIG. 6
ENCRYPTED TUPLE LIST FOR SMITH
<u>3022c</u>
| 30221 — ENCRYPTED RIND (1) | Y = Xrind(1)/zvalue(SMITH, 1) | — 30222 |
|---|---|---|
| ENCRYPTED RIND (3) | Y = Xrind(3)/zvalue(SMITH, 2) | |
FIG. 7
<u>30221</u>
1 → RANDOM PERMUTATION → ENCRYPT WITH CLIENT KEY → ENCRYPTED RIND(1)
FIG. 8
<u>30222</u>
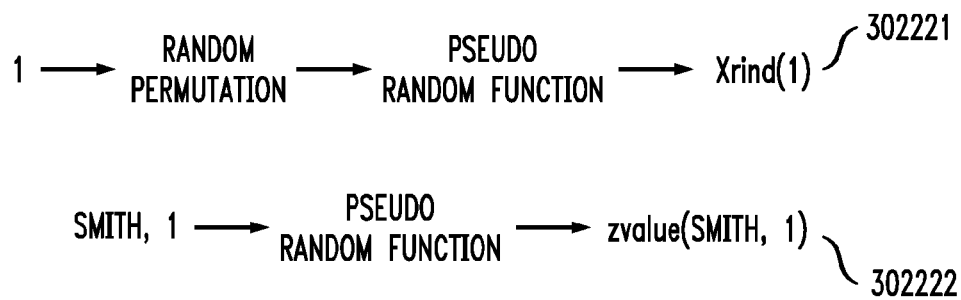
1 → RANDOM PERMUTATION → PSEUDO RANDOM FUNCTION → Xrind(1) ⟋ 302221
SMITH, 1 → PSEUDO RANDOM FUNCTION → zvalue(SMITH, 1) ⟍ 302222

FIG. 9

XSet
303

| | |
|---|---|
| 3031a → | EXPONENTIATION(Xrind(1) * xvalue(SMITH)) |
| 3031b → | EXPONENTIATION(Xrind(3) * xvalue(SMITH)) |
| 3031c → | EXPONENTIATION(Xrind(1) * xvalue(JOHN)) |
| 3031d → | EXPONENTIATION(Xrind(3) * xvalue(ELAINE)) |
| 3031e → | EXPONENTIATION(Xrind(1) * xvalue(MALE)) |
| | EXPONENTIATION(Xrind(3) * xvalue(FEMALE)) |
| | .... |
| | |
| | |
| | |

SMITH ⟶ PSEUDO RANDOM FUNCTION x ⟶ xvalue (SMITH)

3031a: EXPONENTIATION IS IN A CYCLIC GROUP w.r.t. A KNOWN BASE

EXPONENTIATION IS IN A CYCLIC GROUP TO FIXED BASE (SEE 3031a)
SEE 302222 AND 303 FOR zvalue AND xvalue RESPECTIVELY

CONJUNCTIVE SEARCH IN ENCRYPTED DATA

This invention was made with Government support under Contract No. D11PC20201 Intelligence Advanced Research Projects Activity (IARPA). The Government has certain rights in this invention.

CROSS REFERENCE TO RELATED APPLICATION

This patent application is related to the U.S. patent application Ser. No. 13/958,730, entitled "Masking Query Data Access Pattern in Encrypted Data," and filed concurrently herewith, the disclosure of which is incorporated by reference herein in its entirety.

FIELD

The present application relates to data management in a computing system and, more particularly, to improved searching in encrypted data in such a computing system.

BACKGROUND

Contracting out data storage functions to storage service providers that operate external servers (e.g., "the cloud") is a major industry trend that offers great benefits to database owners. At the same time, the contracting out of data storage functions raises confidentiality and privacy concerns. Simple encryption of such data is a hindrance to search capabilities such as the data owner wanting to search a backup or email archive, or query a database via attribute-value pairs. This problem has motivated much research on advanced searchable encryption schemes that enable searching on the encrypted data while attempting to protect the confidentiality of data and queries.

SUMMARY

Embodiments of the invention provide techniques for improved searching in encrypted data in a computing system.

For example, in one embodiment, a method comprises receiving a first cryptographic token for one search term and a second cryptographic token is generated using the one search term and at least another search term. A first search is conducted using the first cryptographic token to generate a first result set, and the second cryptographic token is used for computing a subset of results of the first result set.

In another embodiment, a method comprises generating a first cryptographic token from a first search term, and generating at least a second cryptographic token from the first search term and a second search term. The generating steps are performed in accordance with at least one processing device. The first and second cryptographic tokens are sent to another processing device.

In yet another embodiment, a computer program product is provided which comprises a processor-readable storage medium having encoded therein executable code of one or more software programs. The one or more software programs when executed by one or more processing devices implement steps of one or more of the above-described methods.

In a further embodiment, an apparatus comprises a memory and a processor operatively coupled to the memory and configured to perform steps of the one or more above-described methods.

Advantageously, illustrative embodiments serve to improve conjunctive searching in a database to reduce computation complexity and privacy leakage.

These and other objects, features, and advantages of the present invention will become apparent from the following detailed description of illustrative embodiments thereof, which is to be read in connection with the accompanying drawings.

BRIEF DESCRIPTION OF THE DRAWINGS

FIG. 6 illustrates a methodology for generating entries in an encrypted tuple list according to an embodiment of the invention.

FIG. 7 illustrates a methodology for generating an encrypted rind according to an embodiment of the invention.

FIG. 8 illustrates a methodology for generating a value associated with a tuple according to an embodiment of the invention.

FIG. 9 illustrates a second data structure associated with an encrypted database according to an embodiment of the invention.

DETAILED DESCRIPTION

Figure 1A:
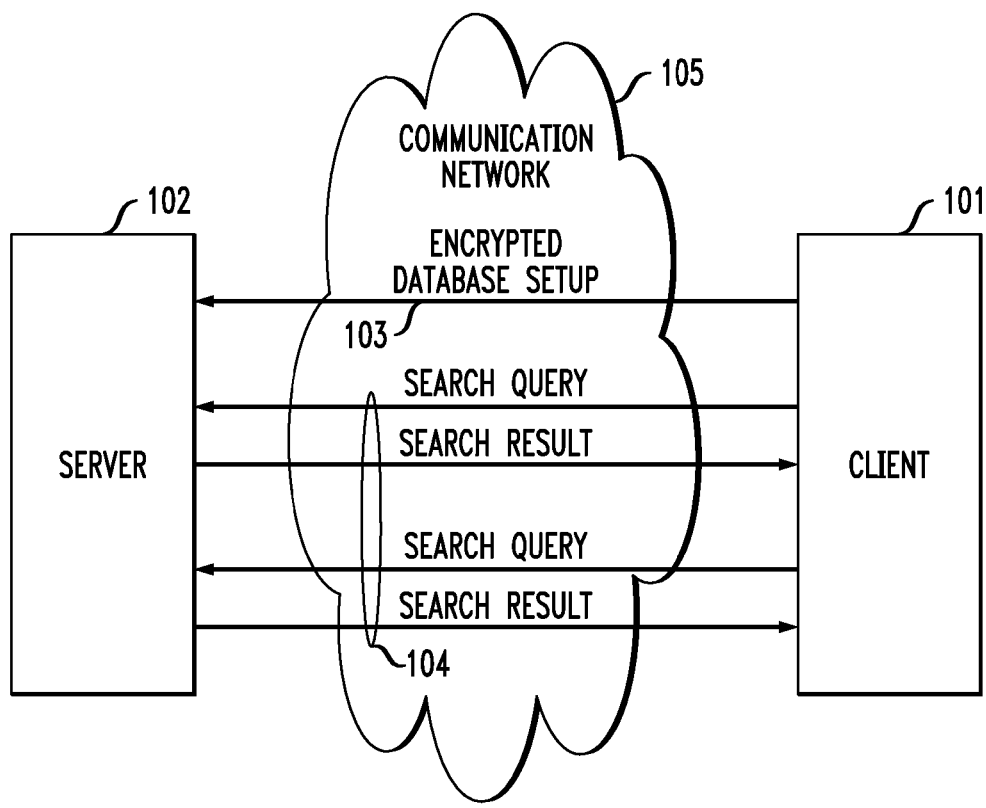
FIG. 1a illustrates a client/server computing system according to an embodiment of the invention.

Embodiments of the present invention will be described herein with reference to exemplary computing systems including operatively coupled processing devices such as one or more servers and one or more client devices (clients). It is to be appreciated, however, that embodiments of the invention are not restricted to use with the particular illustrative system and device configurations shown. Moreover, the phrase "computing system" as used herein with respect to various embodiments is intended to be broadly construed, so as to encompass, for example, private or public cloud computing systems, or parts thereof. However, a given embodiment may more generally comprise any arrangement of processing devices.

As mentioned above, much research has been performed on advanced searchable encryption schemes that enable searching on encrypted data while protecting the confidentiality of data and queries.

Searchable symmetric encryption (SSE) is a cryptographic primitive that addresses encrypted searches. To securely store and search a database with an SSE scheme, a client first uses an encryption algorithm which produces an encrypted version of the database that includes the original data in encrypted form along with additional encrypted metadata that is then stored on the server. Later, the client can interact with the server to carry out a search on the database and obtain the results. This is called the symmetric setting as there is a single owner of the data that writes to the database. The public key variant of the problem has also been extensively studied.

An important line of research gives practical constructions of SSE that support searching for documents that contain a single specified keyword. In these schemes, the server's work in a search is independent of the size of the database, scaling with the number of documents matching the query. Leakage to the server in these schemes is limited to the set of returned (encrypted) documents and some global parameters of the system such as total size and number of documents. However, it has been noted that even this limited privacy leakage can lead to significant privacy leakage with some advanced statistical analysis.

Conjunctive Search.

To provide a practical search capability, a system should at least support conjunctive search, namely, given a set of keywords, find all documents that contain all these keywords. Clearly, this problem can be reduced to the single-keyword case by performing a search for each individual keyword and then letting the server or client compute the intersection between the resultant document sets. This results in not just inefficient searches (e.g., half the database size if one of the conjunctive terms is "gender=male") but more importantly in significant leakage, e.g., it reveals the set of documents matching each keyword. Yet, this naive and "leaky" solution is believed to be the only existing sub-linear solution to SSE conjunctive search. Sub-linearity here refers to the fact that the computational time of this search is less than the size of the database. All other known solutions require server's work that is linear in the size of the database, i.e., they require search time which is proportional to the size of the database, even if the result of the query was a small subset of the database.

Embodiments of the invention, as will be illustratively explained herein, provide solutions to conjunctive queries that can be practical even for very large datasets where a linear search is prohibitively expensive. Further, embodiments of the invention leverage a conjunctive search method to address the issue of privacy leakage. For example, in an encrypted data setting, the search is executed with a complexity proportional to the number of matches of the least frequent term in the conjunction.

Most existing search protocols for encrypted databases work by a "virtual" secure two-party protocol in which the server holds encrypted pointers to documents, the client holds a list of keywords, and the output of the protocol is the set of encrypted pointers that point to documents containing all the client's keywords. The client is then able to decrypt these pointers and obtain the matching (encrypted) documents but the server cannot carry out this decryption. However, while the protocols try to achieve privacy, i.e., the server not learning the keywords in the client's query, it is not always possible in schemes which are also not extremely slow.

Embodiments of the invention, as will be illustratively explained herein, provide an improved approach that pre-computes parts of the protocol messages and stores them in encrypted form at the server. Then, during search, the client sends information to the server that allows the server to unlock these pre-computed messages without further interaction.

Existing SSE schemes for conjunctive queries work by encoding each document individually and then processing a search by testing each encoded document against a set of tokens. Thus, the server's work grows linearly with the number of documents, which is infeasible for large databases. In addition, these existing schemes only work for attribute-value type databases (i.e., where documents contain a single value per attribute) but not for unstructured data, e.g., they cannot search text documents.

Embodiments of the invention, as will be illustratively explained herein, provide sub-linear conjunctive-search solutions for arbitrarily-structured data, including free text. In particular, when querying for the documents that match all keywords $w_1, \ldots, w_i, \ldots, w_t$, a protocol according to one embodiment of the invention scales with the size of the (estimated) smallest matching result set among all the conjunctive terms $w_i$, i.e., atomic keywords. Advantageously, embodiments of the invention reduce both computation and leakage by tying those to the less frequent terms in the conjunctions (i.e., terms $w_i$ with small sets of matching records).

Details of these and other illustrative embodiments of the invention will now be described in conjunction with the figures.

FIG. 1a depicts a client 101 and a server 102 operatively coupled via a communication network 105. The communication network 105 can be any type of network, such as a wide area network (WAN), a local area network (LAN), a satellite network, a telephone or cable network, or various portions or combinations of these and other types of networks. The communication network 105 may be part of a private computing system and/or public cloud computing system. It is assumed that the client 101 wishes to store its database encrypted at the server 102, and yet have search capabilities.

Figure 1B:
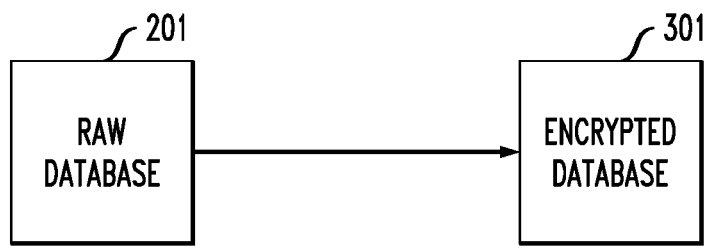
FIG. 1b illustrates an encrypted database setup according to an embodiment of the invention.

There is a setup phase where the client 101 engages in an encrypted database setup process, as shown in step 103. In one embodiment, this process is performed fully at the client 101, as illustrated in FIG. 1b, as a result of which the client 101 takes a raw database 201 and generates an encrypted database 301 using a given encryption algorithm. The client 101 then sends the encrypted database to the server 102, as shown in step 103 of FIG. 1a. Subsequently, the client 101 may request (multiple) search queries, as shown in step 104 of FIG. 1a. One illustrative embodiment of this search protocol is described in detail below in the context of FIG. 10.

Figures 2, 3:
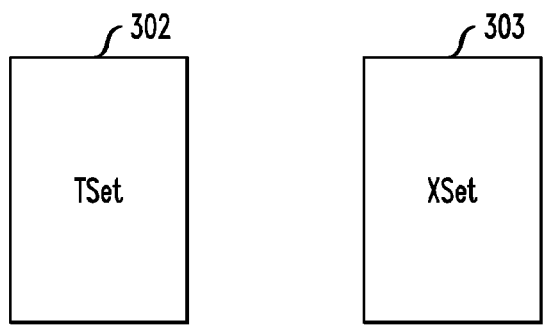
FIG. 2 illustrates a raw database according to an embodiment of the invention.
FIG. 3 illustrates an encrypted database according to an embodiment of the invention.

FIG. 2 shows an example raw database 201, which is a list of records. Each record in this database has a record index 202, which may or may not be a number. In this example, each record also has values for four attributes, the attributes being "First name" (203a), "Last Name" (203b), Gender (203c), and Age (203d). In some instances, an additional attribute can be free text, e.g., a notes field. Each record also has data 204 associated with it. Typically, a user or client is interested in obtaining the data associated with all records that satisfy a query on attribute values. For example, a query issued for data associated with all records which have Last Name: Smith and Gender: female would result in returning record index 3 in this example.

FIG. 3 shows that the encrypted database 301, produced by the client 101, has two main components, a TSet 302 and an XSet 303. The TSet is a data structure used for searching for a primary attribute value. The XSet is used to search for additional secondary attributes. As we will made evident below, this organization allows a conjunctive search to be performed so that a secondary attribute value of a first query is not revealed to (the server to) be identical to a secondary attribute value of a second query, even though they are the same. This is one of the main features of embodiments of the invention, i.e., to mask query data and the actual composition of the database.

Figures 4, 5:
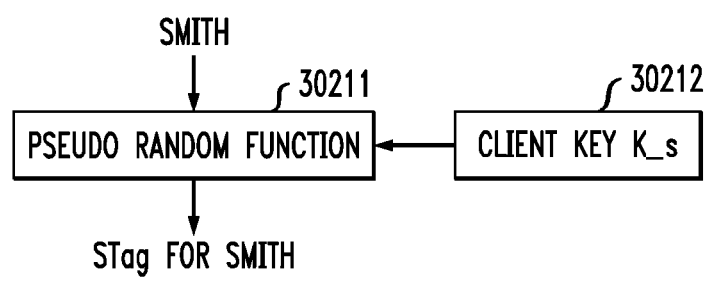
FIG. 4 illustrates a first data structure associated with an encrypted database according to an embodiment of the invention.
FIG. 5 illustrates a methodology for generating a search tag according to an embodiment of the invention.

FIG. 4 shows an illustrative organization of the TSet 302. The TSet 302 includes of multiple entries (a through f, or more), each entry consisting of a STag 3021 (which stands for "Search Tag") and a list of encrypted tuples 3022. Each potential value in the raw database (regardless of which attribute it may be a value of) has an entry in the TSet 302.

FIG. 5 shows an example of how the STag is obtained, in particular STag 3021c from FIG. 4. Since the encrypted database 301 is being created by the client 101 in this embodiment, it is the client 101 generating this STag for each possible value in the database. The client 101 uses a pseudo-random function 30211 which is a well-known construct in the cryptographic art. The pseudo-random function takes a secret key, in this instance, client key $K_s$ (30212). This key is generated secretly by the client 101 before the encrypted database setup 103, and is used in generating the STag. The same key is used later during the encrypted search process (to generate STag).

FIG. 6 illustrates the entries in an encrypted tuple list 3022. This figure shows the example for the value "Smith" (3022c in FIG. 4). Since in the raw database example (FIG. 2), Smith occurs in two records (record index 1 and record index 3), the list of tuples for "Smith" has a length of two. The first tuple corresponds to the appearance in record index 1, and the second tuple corresponds to the appearance in record index 3. However, these need not be stored in this order in this list of tuples, and in fact a random ordering is preferred. Each tuple has two values: an encrypted rind (30221) and a Y value (30222). The encrypted rind is obtained, as shown in FIG. 7, by applying a random permutation to 1 (the raw record index) to get a rind (randomized index). For example, if there are 50 records in the raw database, this random permutation would yield a random value from 1 to 50. Next, it (rind) is encrypted with a (second) secret client key ($K_e$) to obtain the encrypted rind.

FIG. 8 illustrates how the Y value is obtained. Each Y value is obtained from two inputs: the value for which the list of encrypted tuples is being obtained, i.e., "Smith" in this example, and the record index in which this occurrence of "Smith" happens to be. First an Xrind (302221) value is obtained, which is simply a pseudorandom function applied to rind value (see FIG. 7). This pseudorandom function takes yet another secret client key ($K_1$). Next, a zvalue (302222) is obtained (FIG. 8) by applying a pseudorandom function to "Smith" and the current count of the numbered occurrence of "Smith" in the raw database. This pseudorandom function takes another client secret key ($K_Z$). Finally, the Y value is obtained by dividing the Xrind value by the zvalue.

Before continuing, it is to be noted that the same pseudorandom function can be used for the three different client keys mentioned above. By way of example only, this pseudo-random function can be the well-known SHA-2 (secure hash algorithm) cryptographic hash function, or its well-known HMAC (hash message authentication code) extension.

FIG. 9 shows an illustrative organization of the XSet 303. The XSet is a large table, with one entry for each occurrence of a value in the raw database. Thus, for example, since "Smith" occurs two times in our example database, there are two entries. Similarly, since age 23 occurs twice in the database, it will have two entries in the XSet. These values are obtained as follows. First the Xrind value (302221) is obtained as explained above in the context of FIG. 7. Next, an xvalue is obtained for the particular value (e.g., "Smith" in 3031a). This xvalue is obtained by applying a pseudo-random function to value "Smith" with a client secret key ($K_X$). The xrind value and the xvalue are multiplied together. Next, this product is exponentiated to a known base in an algebraic cyclic group (this operation is well known in the art). The result of this exponentiation is the value in the XSet. The XSet can also be organized as a hash table, as is well known in the art, as all that will be required (during search queries) is to check if a particular value occurs in the XSet. It can also be organized as a Bloom filer, also well known in the art.

Figure 10:
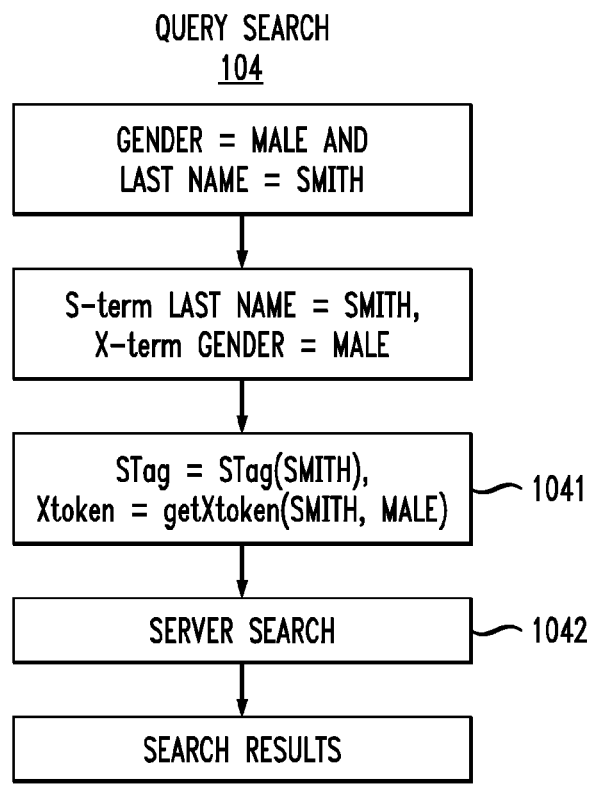
FIG. 10 illustrates a methodology for performing a search query according to an embodiment of the invention.

FIG. 10 depicts illustrative main steps in a search query 104 (FIG. 1a). For example, suppose the client 101 wants to search for Gender "Male," and last name "Smith" in the encrypted database 301. In particular, it is assumed that the client 101 having obtained and stored the encrypted database at the server 102, has deleted (or stored in a not so easily accessible manner) its own copy of the raw database. The only pointers remaining with the client 101 are the various secret keys it used to generate the encrypted database. Using these secret keys, the client 101 generates capabilities which it provides to the server 102. The server 102 uses these capabilities and the TSet and the XSet to return the correct (record) entries to the client 101.

Continuing with the description of FIG. 10, the client 101 first determines the s-term and the x-term for its conjunctive query. The s-term is that conjunct in a search query which is to be used for primary search. It is beneficial for privacy purposes to choose that conjunct to be an s-term which is likely to return the least number of records on its own. Typically, the client 101 does not have or retain exact numbers, but can use statistical information to determine which attribute in a conjunctive query to be made the s-term. For example, the gender would never be made the s-term, as it will return about half the database. Next, the client 101 generates the STag corresponding to the s-term value, i.e., "Smith." This STag is obtained as described above in the context of exactly FIG. 5 using client secret key $K_s$. The client 101 also generates an X-token (1041) which takes as input both the x-term "Male," as well as the s-term "Smith." The STag and the X-token are then sent to the server 102, which uses these as capabilities to search (1042) for the records which have both "Male" and "Smith" (gender and last name, respectively).

Figure 11:
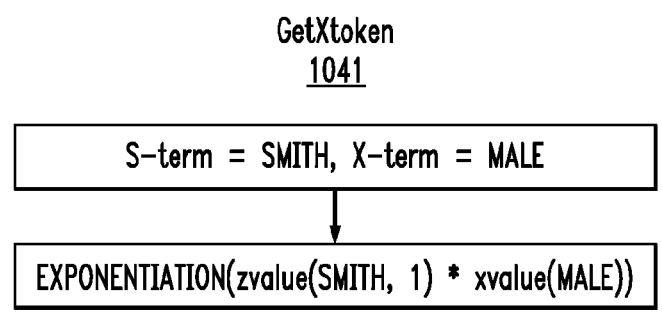
FIG. 11 illustrates a methodology for generating a token for a server to perform a search query according to an embodiment of the invention.

FIG. 11 illustrates how the X-token is obtained from Smith and Male. First, the client 101 obtains the zvalue (302222) for s-term Smith as illustrated above in the context of FIG. 8. It uses an additional count 1, 2, ... up to a maximum of the total expected values of Smith in the database. Then, the xvalue (cross value) is obtained for x-term Male (see FIG. 9). Next, the product of these two values is exponentiated to a known base in the same cyclic group as used in the encrypted database setup. Thus, if g is the fixed base, then the X-token is g to the power (zvalue (Smith,1)*xvalue(Male)).

Figure 12:
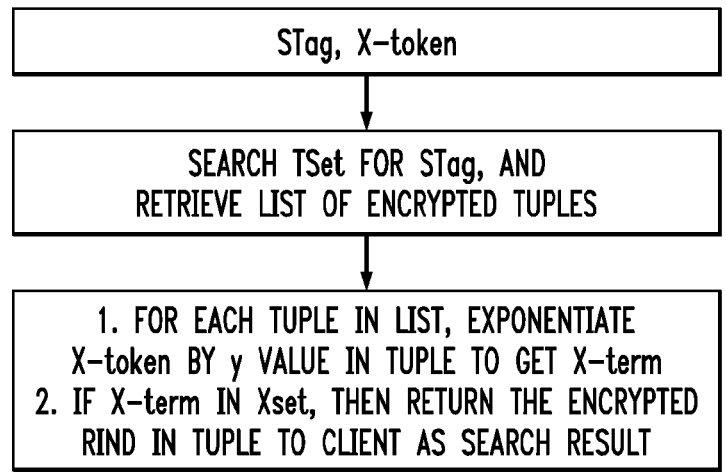
FIG. 12 illustrates a methodology for a server to perform a search query using a token and a search tag provided by a client according to an embodiment of the invention.

FIG. 12 illustrates how the server 102 performs search using the STag and the X-token provided by the client 101. First, the STag is used to search for the encrypted tuples corresponding to Smith in the TSet. Notice, the server 102 cannot deduce directly that the s-term is "Smith." It might be able to deduce some statistical information about the s-term from the number of entries in the list of encrypted tuples. Recall each entry in the list of encrypted tuples (30222) includes an encrypted rind and a Y-value. For each such entry, the server 102 exponentiates the provided X-token to the Y-value. Thus, since the first tuple has Y-value (Xrind (1)/zvalue(Smith, 1)), this exponentiation of X-token (which is g to the power (zvalue(Smith,1)*xvalue(Male)) to Y-value results in g to the power (Xrind(1)*xvalue(Male)). Next, the server 102 checks if this value (called xterm) is in the XSet, which it is indeed (see 3031e in FIG. 9). If the value is in the XSet, the server 102 returns the corresponding encrypted rind to the client 101, which in this case is the encryption of rind(1) (30221 in FIG. 6). The server 102 continues this process for each tuple in the encrypted list of tuples, and returns all the encrypted rinds for tuples for which the computed xterm is in XSet. The client 101 can use the key $K_e$ (FIG. 7) to decrypt the encrypted rinds, to obtain the raw rind. The client 101 also knows the random permutation used in generating rinds, and hence can obtain the actual record index.

An important thing to note in this embodiment is that the capabilities sent to the server 102 during a first encrypted search and the capabilities sent to the server 102 during a second encrypted search are less revealing than a naive approach as follows: while the STag is computed purely based on the s-term, and hence if the same s-term is used in the two queries, the STag would be the same, and hence the server gets to infer that the s-term being searched in the two queries is the same. But, since we advise the client to choose that value as s-term which is rather rare, the number of queries for which s-term is the same goes down considerably, leading to less statistical information for the server. More importantly, the X-token (that is the capability to search for the x-term) is generated from both the s-term and the x-term, and it can be formally proven that if the s-term is different, and the x-term is the same in two queries, then the X-token generated in the two queries are not relatable. This leads to a considerable preservation of privacy as compared to earlier practical schemes.

We now describe further masking techniques for privacy enhancement according to embodiments of the invention. We analyze the probability of correctly identifying keywords based just on the number of documents containing the keyword and knowledge of the distribution from which the documents are sampled. Unless otherwise mentioned, n will be the number of documents in the database, and m will be the number of words in each document. For structured databases, when focusing on a single attribute, m can essentially be taken to be 1 and the analysis below applies seamlessly.

To start with, consider the case where an adversary is given the number X of documents containing some keyword and it has to guess between two potential keywords $w_1$ and $w_2$. The adversary also knows the probability $p_1$ (and $p_2$) of keyword $w_1$ (respectively, $w_2$) occurring in a document. Further, assume that the documents are independently populated with keywords, i.e., the probability of keyword $w_1$ occurring in document D is independent of it occurring in document D'. Note however that the probability of keyword w occurring in a document D and another keyword w' occurring in the same document may not be independent, and we will address such pair-wise statistics further below.

It is well known in probability theory that given the statistic X, if there are a large number of keywords with probability close to $p_1$, then it is difficult to distinguish between $w_1$ and these other keywords based on the statistic X.

One can also consider the situation, that the adversary is given two statistics $X_1$ and $X_2$, one representing the number of documents containing keyword $w_1$, and the other representing the number of documents containing $w_2$. A natural (and maximum likelihood) strategy is to guess that the larger of $X_1$ and $X_2$ comes from documents containing $w_1$ (since $p_1 > p_2$). However, it can be shown using well-known Chernoff tail bounds from probability theory that the probability of making an incorrect guess is inversely proportional to an exponential in $|p_1-p_2|$-square and n.

Thus, if $p_1$ and $p_2$ are too close (relative to the number of documents available), then even the two statistics do not help to correctly guess the keyword associated with each statistic. In fact, consider a more general situation where there are $c_1$ different keywords each with probability of occurrence $p_1$, and $c_2$ keywords with probability $p_2$. Now, given $c_1+c_2$ different values X, one each for the size of documents containing the $c_1+c_2$ keywords, the maximum likelihood strategy is to call the largest set among the different X to belong to a keyword with probability p_1 (recall $p_1 > p_2$). However, this strategy still makes an incorrect call with probability inversely proportional to an exponential in $|p_1-p_2|$-square and $(c_1+1)$. Thus, if these latter quantities make a small fraction, then each of the $c_2$ keywords of the latter ($p_2$) kind are practically indistinguishable from the $c_1$ keywords of the former ($p_1$) kind.

A natural question to ask is whether one can estimate the average number of keywords which have probability of occurrence close to that of another fixed keyword. Of course, this requires assuming that the keyword probabilities themselves follow some natural distribution. For example, let us assume that these keyword probabilities follow a well-known power law. The power law assumption for keyword distribution assigns to the i-th most frequent keyword a probability proportional to 1/i. Clearly this will not serve for worst-case keyword probabilities, but it does fortunately cover many natural distributions (words in most natural languages are empirically known to satisfy power law distribution of frequency).

For any keyword w, let R(w) denote its rank, with the most frequent keyword being ranked one. Also, let S(i) denote the inverse of the function R, i.e., 1/R(i).

Statistics Based on Individual Keywords.

We first ignore the possibility of adversarial access to size of intersections of documents satisfying two or more keywords, and focus instead on statistic X as above. Assume that there are exactly m words in each document (with repetition of keywords). Let q(i) denote this probability for the keyword S(i) (=1/R(i)).

It can be mathematically shown that if m=log n, then only keywords S(i) such that i less than cube-root of n can be distinguished. Similarly, if m=fourth-root of n, then only keywords S(i) such i is between fourth root of n and 5/12-th root of n can be distinguished. As a further example, if m=square-root of n, then only keywords S(i) such that i is between square-root of n divided by log n and square-root of n can be distinguished.

Essentially, in the latter two cases, there are too many keywords with very high probability of occurrence, i.e., q(w) close to 1, and hence they cannot be distinguished from each other. The first case of m about log {n} is also applicable to structured databases where each attribute has a single keyword associated to it (essentially m=1 in that case).

Exploiting Pairwise Probabilities.

In some situations it is possible that an adversary also has access to approximate value of pairwise frequencies or probabilities of keywords. Thus, the adversary may know not just the probability of keyword w occurring in a document, but it may also know the probability of keyword w occurring along with keyword u in a document. Further, the probability of both w and u occurring in a document may be different from the product of the individual probabilities by a significant margin.

Further, the adversary may get access to the number of documents which have both keywords, either because such a query was legitimately made, or if the scheme is weak and it allows the adversary to take intersection of results from two different queries, one for keyword w and another for keyword u.

In the latter case, i.e. of a weak scheme, the adversary in fact gets the number of documents containing pairwise keys, for all pairs (and in fact all k-wise intersections) corresponding to legitimate single keyword queries. So, let's first focus on the ramifications of such a broad disclosure to the adversary. The first thing to note is that in the examples listed in the previous sub-section, the keywords with high probabilities (i.e., close to 1) can now be distinguished by focusing on pairwise probabilities (with, for example, keywords with not so high probabilities).

Thus, the more pertinent question is whether such additional information can be used to distinguish keywords with rank i, such that i>square-root of n (in case of m=square-root of n, for example). Again, for such keywords w taking intersection with keywords u, where u have high probability can lead to distinguishing statistics, e.g., by using well-known chi-square statistics, which closely approximate the maximum likelihood test. The more the number of keywords searched, and hence the more the number of pairwise numbers available, the higher the chances of correctly distinguishing a keyword.

However in illustrative embodiments described here, not all pairwise numbers are available to the adversary. We can assume that most queries, except for a few exceptions, will be of the following type: (1) single keyword queries where the keyword's probability of occurrence is small, so that the expected size of the number of documents is small (even for keywords where the expected number of documents is large, the client may only be interested in a small subset of results); or (2) conjunctive queries where the first keyword (conjunct) has a small probability of occurrence.

From queries of type (1), the adversary can get intersection of all pairs of such queries, i.e., pairwise keyword statistics (this does not happen with structured databases, as intersection of two keywords for the same attribute is empty). Similarly, from queries of type (2), in some scenarios (e.g., when the second keyword is same), the adversary can get intersection of some of these pairs of queries. The important point to note is that these keywords themselves have small probabilities (in most cases). Again, it should be noted that we are just estimating the loss of privacy which is inherent when the sizes of the queries are disclosed, and how it is mitigated when most queries are conjunctive and only the size of the conjunctive queries is revealed.

Focusing on keywords with rank square-root n or larger, if such a keyword $w_1$ is paired with another such keyword $w_2$, then the combined probability is about 1/n (assuming no correlation). However, if the two keywords are correlated and the combined probability remains close to reciprocal of square-root of n, then there is a possibility of identifying the keywords; this can happen if there are not many such other competing possibilities. However, embodiments of the invention remedy this situation in a manner as will now be described.

Masking by Adding Dummy Records.

For keywords S(i) with rank i such that they only had a constant number of other competing keywords, one can consider adding dummy documents, where keywords are added (marked) to dummy documents with the same average probability, hence smoothing the probability differences. To start, consider the case where two competing keywords have individual frequencies $f_1$ and $f_2$. Assume that these frequencies are known to an adversary. We wish to add noise, i.e., fake documents (e.g., (alpha−1)*n fake total documents, for some factor alpha), such that each of the keywords is marked in a document with the same average probability $(f_1+f_2)/2$.

We next note whether adding dummy documents also smoothens pairwise probabilities. Suppose there are two keywords $w_1$ and $w_2$ with respective probabilities $p_1$ and $p_2$, which are too close to be distinguished by statistic X alone. However, when paired with a keyword A with a large probability (e.g., tending to 1), the joint probability of one of the keywords (e.g., w2) drops significantly to $p_{\{w2A\}} \ll p_2$, whereas $p_{\{w1A\}}$ remains close to $p_1$. But, by adding dummy documents, it is easy to show that the effective joint probability of $w_2$ and A is close to $p_2$ (alpha−1)/alpha in the worst case (i.e., if $p_{\{w2A\}}=0$), where alpha is the ratio of dummy plus real to real documents. Now, note that if $|p_1-p_2|$-square $<p_1(1-p_1)/n$ (which is the requirement for indistinguishability by statistic X alone), then tail-bounds show that ($w_1$ and A) and ($w_2$ and A) remain indistinguishable if alpha>square root of $(n*p_1/(1-p_1))$. Thus, note that if $p_1$ is approximately 1 in square root of n, then alpha needs to be quite large, which is impractical. However, this attack is only possible if the adversary knows that Pr[A] is large for the query $w_2$ and A, for only then does it determine that Pr[W and A] is much smaller than Pr[w] times Pr[A]. But in the illustrative embodiments described here, the statistics and/or identity about the second conjunct are not revealed to the adversary, and hence this attack does not work.

Masking by Duplicating Documents.

The other situation of correlated keywords is where the two keywords have low probability, e.g., $p_1, p_2 < 1$ in square-root of n, but they are highly correlated so that their joint probability remains close to $p_1$. In such a case, even if we added dummy documents with complete anti-correlation between the two keywords, and if alpha is close to 1, the effective joint probability of the two keywords would still remain very high. This leads us to the possibility of adding duplicate documents. In other words, the actual (randomized) encrypted documents would be duplicated, so that if a documents D has both keywords $w_1$ and $w_2$, then the first (encrypted) copy of D would only be labeled with $w_1$, and the second copy of D would only be labeled with $w_2$. However, to do this procedure effectively over all keywords can be challenging. Fortunately, we can make use of the fact that if too many pairs of keywords are highly correlated, then that in itself leads to a combinatorial explosion for an adversary to identify keywords.

So, embodiments of the invention provide a heuristic which is effective. We will focus on keywords with low probability of occurrence q, i.e., q<1 in square-root of n. First note that, if two keywords are indistinguishable by their individual statistic, then their pairwise probability being high just makes them indistinguishable from each other. Thus, divide the keywords into groups of about log n such that their probabilities of occurrence q are too close to be distinguishable. Let the groups be named $G_1, G_2, \ldots$ and so on. We can restrict the number of such groups to about square-root of n divided by log n. Now, we look at pairs of keywords between any two groups. If for example, there is a unique pair ($g_i$ in $G_i$) and ($g_j$ in $G_j$) such that $g_i$ and $g_j$ are highly correlated (and all other pairs (k, l) with k and l different from i and j) are not highly correlated, then clearly the adversary can identify $g_i$ and $g_j$ based on pairwise statistics. If on the other hand, there are too many such combinations within any pair of groups $G_i$ and $G_j$, then this leads to a combinatorial explosion of possibilities, and hence the adversary cannot identify the keywords. Again, if there are a few such pairs per pair of groups, again the adversary can possibly identify the keywords, but then we apply a heuristic method of assigning keywords to duplicate (encrypted) copies. Now, for some keyword $g_i$ in group $G_i$ if there are too many keywords in other groups which are correlated with it, then we can put them all into the same group by adding dummy documents. Then, these keywords (a large set of them, e.g., log n in number) are in competition with each other, and hence not distinguishable. If for every keyword there are few keywords correlated with it, then we need about that many duplicate copies.

As will be appreciated by one skilled in the art, embodiments of the invention may be embodied as a system, apparatus, method or computer program product. Accordingly, embodiments of the invention may take the form of an entirely hardware embodiment, an entirely software embodiment (including firmware, resident software, micro-code, etc.) or an embodiment combining software and hardware aspects that may all generally be referred to herein as a "circuit," "module" or "system." Furthermore, embodiments of the invention may take the form of a computer program product embodied in one or more computer readable medium(s) having computer readable program code embodied thereon.

Any combination of one or more computer readable medium(s) may be utilized. The computer readable medium may be a computer readable signal medium or a computer readable storage medium. A computer readable storage medium may be, for example, but not limited to, an electronic, magnetic, optical, electromagnetic, infrared, or semiconductor system, apparatus, or device, or any suitable combination of the foregoing. More specific examples (a non-exhaustive list) of the computer readable storage medium would include the following: an electrical connection having one or more wires, a portable computer diskette, a hard disk, a random access memory (RAM), a read-only memory (ROM), an erasable programmable read-only memory (EPROM or Flash memory), an optical fiber, a portable compact disc read-only memory (CD-ROM), an optical storage device, a magnetic storage device, or any suitable combination of the foregoing. In the context of this document, a computer readable storage medium may be any tangible medium that can contain, or store a program for use by or in connection with an instruction execution system, apparatus, or device.

A computer readable signal medium may include a propagated data signal with computer readable program code embodied therein, for example, in baseband or as part of a carrier wave. Such a propagated signal may take any of a variety of forms, including, but not limited to, electromagnetic, optical, or any suitable combination thereof. A computer readable signal medium may be any computer readable medium that is not a computer readable storage medium and that can communicate, propagate, or transport a program for use by or in connection with an instruction execution system, apparatus, or device.

Program code embodied on a computer readable medium may be transmitted using any appropriate medium, including but not limited to wireless, wireline, optical fiber cable, RF, etc., or any suitable combination of the foregoing.

Computer program code for carrying out operations for embodiments of the invention may be written in any combination of one or more programming languages, including an object oriented programming language such as Java, Smalltalk, C++ or the like and conventional procedural programming languages, such as the "C" programming language or similar programming languages. The program code may execute entirely on the user's computer, partly on the user's computer, as a stand-alone software package, partly on the user's computer and partly on a remote computer or entirely on the remote computer or server. In the latter scenario, the remote computer may be connected to the user's computer through any type of network, including a local area network (LAN) or a wide area network (WAN), or the connection may be made to an external computer (for example, through the Internet using an Internet Service Provider).

Embodiments of the invention are described herein with reference to flowchart illustrations and/or block diagrams of methods, apparatus (systems) and computer program products. It will be understood that each block of the flowchart illustrations and/or block diagrams, and combinations of blocks in the flowchart illustrations and/or block diagrams, can be implemented by computer program instructions. These computer program instructions may be provided to a processor of a general purpose computer, special purpose computer, or other programmable data processing apparatus to produce a machine, such that the instructions, which execute via the processor of the computer or other programmable data processing apparatus, create means for implementing the functions/acts specified in the flowchart and/or block diagram block or blocks.

These computer program instructions may also be stored in a computer readable medium that can direct a computer, other programmable data processing apparatus, or other devices to function in a particular manner, such that the instructions stored in the computer readable medium produce an article of manufacture including instructions which implement the function/act specified in the flowchart and/or block diagram block or blocks.

The computer program instructions may also be loaded onto a computer, other programmable data processing apparatus, or other devices to cause a series of operational steps to be performed on the computer, other programmable apparatus or other devices to produce a computer implemented process such that the instructions which execute on the computer or other programmable apparatus provide processes for implementing the functions/acts specified in the flowchart and/or block diagram block or blocks.

Referring again to FIGS. 1a through 12, the diagrams in the figures illustrate the architecture, functionality, and operation of possible implementations of systems, methods and computer program products according to various embodiments of the invention. In this regard, each block in a flowchart or a block diagram may represent a module, segment, or portion of code, which comprises one or more executable instructions for implementing the specified logical function(s). It should also be noted that, in some alternative implementations, the functions noted in the block may occur out of the order noted in the figures. For example, two blocks shown in succession may, in fact, be executed substantially concurrently, or the blocks may sometimes be executed in the reverse order, depending upon the functionality involved. It will also be noted that each block of the block diagram and/or flowchart illustration, and combinations of blocks in the block diagram and/or flowchart illustration, can be implemented by special purpose hardware-based systems that perform the specified functions or acts, or combinations of special purpose hardware and computer instructions.

Accordingly, embodiments of the invention, for example, as depicted in FIGS. 1a-12, can also include, as described herein, providing a system, wherein the system includes distinct modules (e.g., modules comprising software, hardware or software and hardware). By way of example only, the modules may include but are not limited to modules executed as part of the client 101 and/or server 102. These and other modules may be configured, for example, to perform the steps described and illustrated in the context of FIGS. 1a-12.

Figure 13:
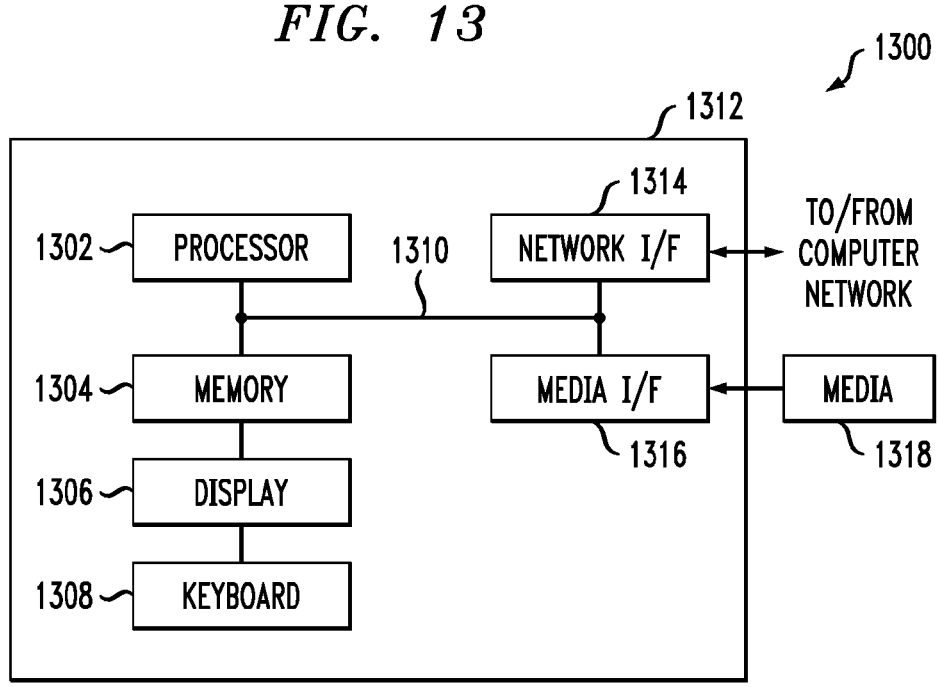
FIG. 13 illustrates a block diagram of a computing system in accordance with which one or more components/steps of modules/methodologies are implemented, according to an embodiment of the invention.

One or more embodiments can make use of software running on a general purpose computer or workstation. With reference to FIG. 13, such an implementation 1300 employs, for example, a processor 1302, a memory 1304, a display 1306 (an example of an output device), and a keyboard 1308 (an example of an input device). The term "processor" as used herein is intended to include (but not be limited to) any processing device, such as, for example, one that includes a CPU (central processing unit) and/or other forms of processing circuitry. Further, the term "processor" may refer to more than one individual processor. The term "memory" is intended to include (but not be limited to) memory associated with a processor or CPU, such as, for example, RAM (random access memory), ROM (read only memory), a fixed memory device (for example, hard drive), a removable memory device (for example, diskette), a flash memory and the like. In addition, the phrase "input/output devices" as used herein, is intended to include (but not be limited to) one or more mechanisms for inputting data to the processing unit and one or more mechanisms for providing results associated with the processing unit.

The processor 1302, memory 1304, and input/output devices 1306/1308 can be interconnected, for example, via bus 1310 as part of a data processing unit 1312. Suitable interconnections, for example, via bus 1310, can also be provided to a network interface 1314, such as a network card, which can be provided to interface with a computer network, and to a media interface 1316, such as a diskette or CD-ROM drive, which can be provided to interface with media 1318.

A data processing system suitable for storing and/or executing program code can include at least one processor 1302 coupled directly or indirectly to memory elements 1304 through a system bus 1310. The memory elements can include local memory employed during actual execution of the program code, bulk storage, and cache memories which provide temporary storage of at least some program code in order to reduce the number of times code must be retrieved from bulk storage during execution.

Input/output (I/O) devices 1306/1308 can be coupled to the system either directly (such as via bus 1310) or through intervening I/O controllers (omitted for clarity).

Network adapters such as network interface 1314 may also be coupled to the system to enable the data processing system to become coupled to other data processing systems or remote printers or storage devices through intervening private or public networks. Modems, cable modem and Ethernet cards are just a few of the currently available types of network adapters.

Accordingly, it is to be understood that the computer architecture 1300 shown in FIG. 13 may represent one illustrative physical implementation of client 101 and/or server 102 as shown in FIG. 1a. For example, a server includes a physical data processing system (for example, system 1312 as shown in FIG. 13) running a server program. Also, the computer architecture 1300 could represent an illustrative implementation of a client, e.g., a laptop, tablet, smartphone, or personal computer.

It will be appreciated and should be understood that the exemplary embodiments of the invention described above can be implemented in a number of different fashions. Given the teachings of the invention provided herein, one of ordinary skill in the related art will be able to contemplate other implementations of the invention. Indeed, although illustrative embodiments of the present invention have been described herein with reference to the accompanying drawings, it is to be understood that the invention is not limited to those precise embodiments, and that various other changes and modifications may be made by one skilled in the art without departing from the scope or spirit of the invention.

What is claimed is:

1. A computer-implemented method, comprising:
   storing, at a first computing device, an encrypted database associated with a raw database, wherein the raw database comprises one or more records corresponding to a first search term, wherein the encrypted database comprises a first component and a second component, and wherein the first component comprises at least a first entry comprising a first cryptographic token and one or more encrypted tuples corresponding to a respective one of the one or more records of the first search term;
   receiving, at the first computing device from a second computing device across a network, a conjunctive query comprising the first search term and a second search term, the first cryptographic token, and a second cryptographic token;
   wherein the first cryptographic token is generated by applying a pseudo-random function using a first secret key to the first term;
   wherein the second cryptographic token is generated by performing an exponentiation of a product of a first value and a second value to a known base; and
   wherein the first value is generated by applying a pseudo-random function using a second secret key to the first search term and a current count of a numbered occurrence of the first search term in the raw database, and the second value is generated by applying a pseudo-random function using a third secret key to the second search term;
   conducting, at the first computing device, a first search in the first component based on the first search term, wherein conducting the first search comprises employing the first cryptographic token to generate a first result set, and wherein the first result set comprises the one or more encrypted tuples corresponding to the first search term;
   conducting, at the first computing device, a second search based on the second search term, wherein conducting the second search comprises employing the second cryptographic token to generate a second result set, wherein the second result set comprises a subset of the one or more encrypted tuples of the first result set; and
   transmitting, from the first computing device, the second result set to the second computing device across the network;

wherein the steps are performed in accordance with one or more processing devices.

2. The method of claim 1, wherein the first search term is filed under the one or more encrypted indices using one or more hash tables.

3. The method of claim 1, wherein the first search term is filed under the one or more encrypted indices using a Bloom filter.

4. The method of claim 1, wherein the one or more pseudo-random functions use one or more cryptographic hash functions.

5. The method of claim 1, wherein the subset of results is generated by employing a hash table.

6. The method of claim 1, wherein the subset of results is generated by employing a Bloom filter.

7. The method of claim 1, wherein the subset of results satisfies the second search term and the first search term.

8. The method of claim 1, wherein the first search term is determined to be less frequent in occurrence than second search term.

9. The method of claim 8, wherein a database is sampled to determine the relative frequency of search terms.

10. The method of claim 1, wherein:
each encrypted tuple comprises an encrypted randomized index value and a third value;
the encrypted randomized index value is generated by encrypting a randomized index value with a fourth secret key, and wherein the randomized index value is generated by applying a random permutation to an index value of the corresponding record; and
the third value is generated by dividing a fourth value by the first value, wherein the fourth value is generated by applying a pseudorandom function using a fifth secret key to the randomized index value.

11. The method of claim 10, wherein employing the second cryptographic token to generate the second result set comprises, for each encrypted tuple, performing an exponentiation of the second cryptographic token to its third value to generate a fifth value, wherein the subset of results of the first result set comprises those encrypted tuples associated with fifth values comprised in the second component.

12. The method of claim 10, wherein the encrypted randomized index values of the encrypted tuples of the second result set are decrypted to obtain the randomized index value.

13. A computer program product comprising a non-transitory processor-readable storage medium having encoded therein executable code of one or more software programs, wherein the one or more software programs when executed by the one or more processing devices implement the steps of the method comprising:
storing, at a first computing device, an encrypted database associated with a raw database, wherein the raw database comprises one or more records corresponding to a first search term, wherein the encrypted database comprises a first component and a second component, and wherein the first component comprises at least a first entry comprising a first cryptographic token and one or more encrypted tuples corresponding to a respective one of the one or more records of the first search term;
receiving, at the first computing device from a second computing device across a network, a conjunctive query comprising the first search term and a second search term, the first cryptographic token, and a second cryptographic token;

wherein the first cryptographic token is generated by applying a pseudo-random function using a first secret key to the first search term;
wherein the second cryptographic token is generated by performing an exponentiation of a product of a first value and a second value to a known base; and
wherein the first value is generated by applying a pseudo-random function using a second secret key to the first search term and a current count of a numbered occurrence of the first search term in the raw database, and the second value is generated by applying a pseudo-random function using a third secret key to the second search term;
conducting, at the first computing device, a first search in the first component based on the first search term, wherein conducting the first search comprises employing the first cryptographic token to generate a first result set, and wherein the first result set comprises the one or more encrypted tuples corresponding to the first search term;
conducting, at the first computing device, a second search based on the second search term, wherein conducting the second search comprises employing the second cryptographic token to generate a second result set, wherein the second result set comprises a subset of the one or more encrypted tuples of the first result set; and
transmitting, from the first computing device, the second result set to the second computing device across the network.

14. A method, comprising:
producing, at a first computing device, an encrypted database associated with a raw database, wherein the raw database comprises one or more records corresponding to a first search term, wherein the encrypted database comprises a first component and a second component, and wherein the first component comprises at least a first entry comprising a first cryptographic token and one or more encrypted tuples corresponding to a respective one of the one or more records of the first search term;
generating, at the first computing device, a conjunctive query comprising the first search term and a second search term, the first cryptographic token, and a second cryptographic token;
wherein generating the first cryptographic token comprises applying a pseudo-random function using a first secret key to the first search term;
wherein generating the second cryptographic token comprises performing an exponentiation of a product of a first value and a second value to a known base; and
wherein the first value is generated by applying a pseudo-random function using a second secret key to the first search term and a current count of a numbered occurrence of the first search term in the raw database, and the second value is generated by applying a pseudo-random function using a third secret key to the second search term; and
transmitting, from the first computing device, the conjunctive query and the first and second cryptographic tokens to the second computing device across a network;
wherein the second computing device is configured to implement the first and second cryptographic tokens in order to conduct a first search based on the first search term and a second search based on the second search term;

wherein the first search is conducted by employing the first cryptographic token to generate a first result set, and wherein first result set comprises the one or more encrypted tuples corresponding to the first search term;

wherein the second search is conducted by employing the second cryptographic token to generate a second result set, wherein the second result set comprises a subset of the one or more encrypted tuples of the first result set; and wherein the steps are performed in accordance with one or more processing devices.

15. The method of claim 14, wherein the first search term is determined to be less frequent in occurrence than second search term.

16. The method of claim 15, wherein a database is sampled to determine the relative frequency of search terms.

17. The method of claim 14, wherein:

each encrypted tuple comprises an encrypted randomized index value and a third value;

the encrypted randomized index value is generated by encrypting a randomized index value with a fourth secret key, and wherein the randomized index value is generated by applying a random permutation to an index value of the corresponding record; and the third value is generated by dividing a fourth value by the first value, wherein the fourth value is generated by applying a pseudorandom function using a fifth secret key to the randomized index value.

18. The method of claim 17, wherein employing the second cryptographic token to generate the second result set comprises, for each encrypted tuple, performing an exponentiation of the second cryptographic token to its third value to generate a fifth value, wherein the subset of results of the first result set comprises those encrypted tuples associated with fifth values comprised in the second component.

19. The method of claim 17, wherein the encrypted randomized index values of the encrypted tuples of the second result set are decrypted to obtain the randomized index value.

20. The method of claim 14, wherein the first search term is filed under the one or more encrypted indices using one or more hash tables.

21. The method of claim 14, wherein the first search term is filed under the one or more encrypted indices using a Bloom filter.

22. The method of claim 14, wherein the one or more pseudo-random functions use one or more cryptographic hash functions.

23. The method of claim 14, wherein the subset of results is generated by employing a hash table.

24. The method of claim 14, wherein the subset of results is generated by employing a Bloom filter.

25. The method of claim 14, wherein the subset of results satisfies the second search term and the first search term.

26. A computer program product comprising a non-transitory processor-readable storage medium having encoded therein executable code of one or more software programs, wherein the one or more software programs when executed by the at least one processing device implement the steps of the method comprising:

producing, at a first computing device, an encrypted database associated with a raw database, wherein the raw database comprises one or more records corresponding to a first search term, wherein the encrypted database comprises a first component and a second component, and wherein the first component comprises at least a first entry comprising a first cryptographic token and one or more encrypted tuples corresponding to a respective one of the one or more records of the first search term;

generating, at the first computing device, a conjunctive query comprising the first search term and a second search term, the first cryptographic token, and a second cryptographic token;

wherein generating the first cryptographic token comprises applying a pseudo-random function using a first secret key to the first search term;

wherein generating the second cryptographic token comprises performing an exponentiation of a product of a first value and a second value to a known base; and wherein the first value is generated by applying a pseudo-random function using a second secret key to the first search term and a current count of a numbered occurrence of the first search term in the raw database, and the second value is generated by applying a pseudo-random function using a third secret key to the second search term; and transmitting, from the first computing device, the conjunctive query and the first and second cryptographic tokens to the second computing device across a network;

wherein the second computing device is configured to implement the first and second cryptographic tokens in order to conduct a first search based on the first search term and a second search based on the second search term;

wherein the first search is conducted by employing the first cryptographic token to generate a first result set, and wherein first result set comprises the one or more encrypted tuples corresponding to the first search term; and wherein the second search is conducted by employing the second cryptographic token to generate a second result set, wherein the second result set comprises a subset of the one or more encrypted tuples of the first result set.

27. An apparatus, comprising:

a memory; and a processor operatively coupled to the memory and configured to:

store, at a first computing device, an encrypted database associated with a raw database, wherein the raw database comprises one or more records corresponding to a first search term, wherein the encrypted database comprises a first component and a second component, and wherein the first component comprises at least a first entry comprising a first cryptographic token and one or more encrypted tuples corresponding to respective ones of the one or more records of the first search term;

receive, at the first computing device from a second computing device across a network, a conjunctive query comprising the first search term and a second search term the first cryptographic token, and a second cryptographic token;

wherein the first cryptographic token is generated by applying a pseudo-random function using a first secret key to the first search term;

wherein the second cryptographic token is generated by performing an exponentiation of a product of a first value and a second value to a known base; and wherein the first value is generated by applying a pseudo-random function using a second secret key to the first search term and a current count of a numbered occurrence of the first term in the raw database, and the second value is generated by applying a pseudo-random function using a third secret key to the second search term;

conduct, at the first computing device, a first search in the first component based on the first search term, wherein the conducting of the first search comprises employment of the first cryptographic token and the one or more encrypted indices to generate a first result set, and wherein the first result set comprises the one or more encrypted tuples corresponding to the first search term;

conduct, at the first computing device, a second search based on the second search term, wherein conducting the second search comprises an employment of the second cryptographic token to generate a second result set, wherein the second result set comprises a subset of the one or more encrypted tuples of the first result set; and transmit, from the first computing device, the second result set to the second computing device across the network.

28. An apparatus, comprising:

a memory; and a processor operatively coupled to the memory and configured to:

producing, at a first computing device, an encrypted database associated with a raw database, wherein the raw database comprises one or more records corresponding to a first search term, wherein the encrypted database comprises a first component and a second component, and wherein the first component comprises at least a first entry comprising a first cryptographic token and one or more encrypted tuples corresponding to a respective one of the one or more records of the first search term;

generate, at the first computing device, a conjunctive query comprising the first search term;

generate, at the first computing device, the first cryptographic token, wherein the generation of the first cryptographic token comprises an application of a pseudo-random function using a first secret key to the first search term;

generate, at the first computing device, a second cryptographic token, wherein the generation of the second cryptographic token comprises a performance of an exponentiation of a product of a first value and a second value to a known base;

wherein the first value is generated by applying a pseudo-random function using a second secret key to the first search term and a current count of a numbered occurrence of the first search term in the raw database, and the second value is generated by applying a pseudo-random function using a third secret key to the second search term; and transmit, from the first computing device, the conjunctive query and the first and second cryptographic tokens to the second computing device across a network;

wherein the second computing device is configured to implement the first and second cryptographic tokens in order to conduct a first search based on the first search term and a second search based on the second search term;

wherein the first search is conducted by employing the first cryptographic token to generate a first result set, comprising the one or more encrypted tuples corresponding to the first search term; and wherein the second search is conducted by employing the second cryptographic token to generate a second result set comprising a subset of the one or more encrypted tuples of the first result set.

* * * * *